(12) United States Patent
Ronk et al.

(10) Patent No.: US 7,182,194 B2
(45) Date of Patent: Feb. 27, 2007

(54) LOW POWER MODULATING CLUTCH CONTROL SYSTEM WITH COMBINATION ACCUMULATOR AND PISTON ACTUATOR

(75) Inventors: Aaron Ronk, Lake George, NY (US); John D. Zalewski, Liverpool, NY (US); James S. Brissenden, Baldwinsville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 220 days.

(21) Appl. No.: 10/931,588

(22) Filed: Sep. 1, 2004

(65) Prior Publication Data

US 2006/0042906 A1 Mar. 2, 2006

(51) Int. Cl.
*F16D 21/00* (2006.01)

(52) U.S. Cl. ............... 192/85 AA; 60/545; 91/433; 192/90

(58) Field of Classification Search ............... None
See application file for complete search history.

(56) References Cited

U.S. PATENT DOCUMENTS

| | | | |
|---|---|---|---|
| 4,862,769 A | 9/1989 | Koga et al. | |
| 4,895,236 A | 1/1990 | Sakakibara et al. | |
| 5,224,906 A | 7/1993 | Sturm | |
| 5,323,871 A | 6/1994 | Wilson et al. | |
| 5,332,060 A | 7/1994 | Sperduti et al. | |
| 5,407,024 A | 4/1995 | Watson et al. | |
| 5,695,037 A * | 12/1997 | Borschert et al. .......... | 192/84.1 |
| 5,934,432 A * | 8/1999 | Bates ...................... | 192/85 C |
| 6,145,644 A | 11/2000 | Mohan et al. | |
| 6,354,977 B1 | 3/2002 | Brown et al. | |
| 6,446,774 B2 | 9/2002 | Porter | |
| 6,484,857 B2 | 11/2002 | Vonnegut et al. | |
| 6,578,654 B2 | 6/2003 | Porter | |
| 6,595,338 B2 | 7/2003 | Bansbach et al. | |
| 6,612,957 B2 | 9/2003 | Bansbach et al. | |
| 6,655,138 B2 | 12/2003 | Shaw et al. | |
| 6,679,565 B2 | 1/2004 | Riddiford | |
| 6,725,990 B2 | 4/2004 | Bowen | |
| 6,745,879 B1 | 6/2004 | Dolan | |
| 6,808,054 B2 * | 10/2004 | Hirt et al. ................ | 192/87.11 |
| 6,997,299 B2 * | 2/2006 | Brissenden et al. ....... | 192/85 R |
| 7,021,445 B2 * | 4/2006 | Brissenden et al. ....... | 192/85 R |
| 2006/0042907 A1 * | 3/2006 | Ronk et al. ............... | 192/85 C |

FOREIGN PATENT DOCUMENTS

| | | |
|---|---|---|
| JP | 2-18117 | 1/1990 |
| JP | 3066927 | 3/1991 |

* cited by examiner

*Primary Examiner*—Saul Rodriguez
(74) *Attorney, Agent, or Firm*—Harness, Dickey & Pierce, P.L.C.

(57) ABSTRACT

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electric motor drivingly coupled to the hydraulic actuator. The hydraulic actuator includes a first piston biasedly engaged by a spring, slidably positioned within a housing and operable to supply pressurized fluid to a second piston. Supply of pressurized fluid to the second piston provides the clutch engagement force.

30 Claims, 5 Drawing Sheets

LOW POWER MODULATING CLUTCH CONTROL SYSTEM WITH COMBINATION ACCUMULATOR AND PISTON ACTUATOR

FIELD OF THE INVENTION

The present invention relates generally to power transfer systems operable for controlling the distribution of drive torque between a pair of rotary shafts and, more particularly, to clutch control systems operable to efficiently convert electrical energy to mechanical potential energy for subsequent actuation of a clutch.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the normally non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. These types of systems are often equipped with motors that may require peak electrical currents greater than optimally desired to operate the clutch actuators. While the above actuator devices may perform adequately for their intended purpose, a need exists for an improved clutch actuation system that requires a relatively low, minimally fluctuating supply of electrical power for operation.

SUMMARY OF THE INVENTION

A power transmission device includes a rotary input member receiving drive torque from a source of torque, a rotary output member for providing drive torque to an output device and a torque transfer mechanism for transferring drive torque between the input member and the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electric motor drivingly coupled to the hydraulic actuator. The hydraulic actuator includes a first piston biasedly engaged by a spring wherein the first piston is slidably positioned within a housing and operable to supply pressurized fluid to a second piston. Supply of pressurized fluid to the second piston provides the clutch engagement force.

BRIEF DESCRIPTION OF THE DRAWINGS

The present invention will become more fully understood from the detailed description given below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of drive torque transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode. The power transfer system of the present invention includes a clutch control system for converting electrical energy to mechanical potential energy to alleviate exceedingly high peak electrical current requirements that may occur during vehicle operation.

Figure 1:
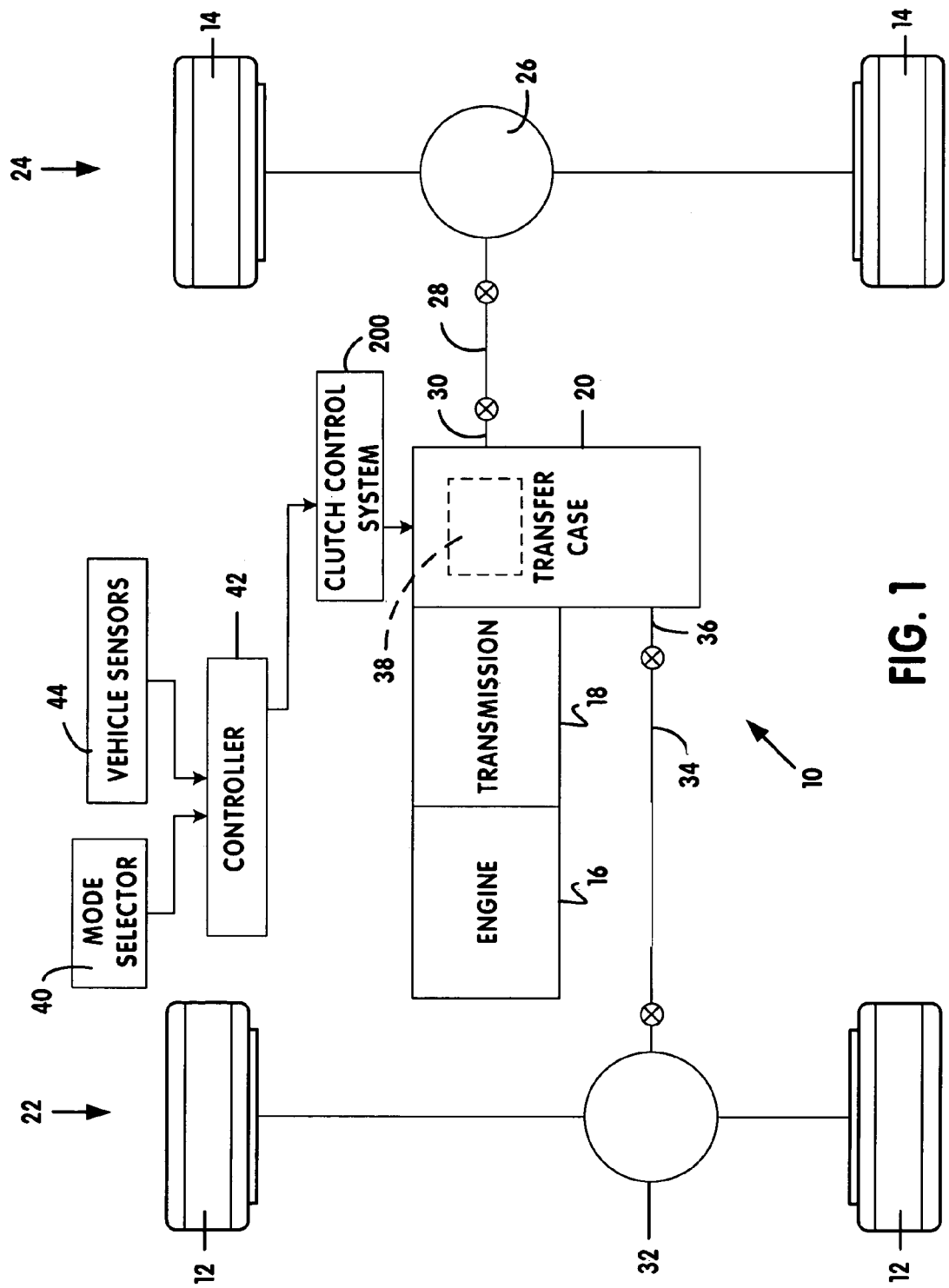
FIG. 1 is a schematic representation of an exemplary four-wheel drive vehicle having the clutch control systems of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer clutch 38 is maintained in a "non-actuated" condition. When the part-time four-wheel drive mode is selected, transfer clutch 38 is fully actuated and maintained in a "lock-up" condition such that second output shaft 36 is, in effect, rigidly coupled for driven rotation with first output shaft 30. When the "on-demand" drive mode is selected, controller 42 communicates with a clutch control system 200 to control the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated state of transfer clutch 38 as described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

FIGS. 2–5 depict various clutch control systems for storing mechanical energy and reducing the maximum required electrical current for clutch actuation. The clutch control systems discussed below are an improvement over prior systems due to their ability to reduce peak power draw and overall power consumption from the vehicle's electrical system while operating the modulating clutch. The decrease in power draw is primarily accomplished by using a relatively low amount of electrical energy over time to charge a mechanical energy storage device and releasing the energy rapidly when required. This control scheme makes it possible to reduce the size of vehicle electrical system including the wires and circuitry controlling the electrical system. Each of the clutch control systems described below provides for operating a modulating clutch or clutches. The controls for the modulating clutches utilize available vehicle information along with hydraulic system information to react to a vehicle command to provide the required torque and/or speed.

Figure 2:
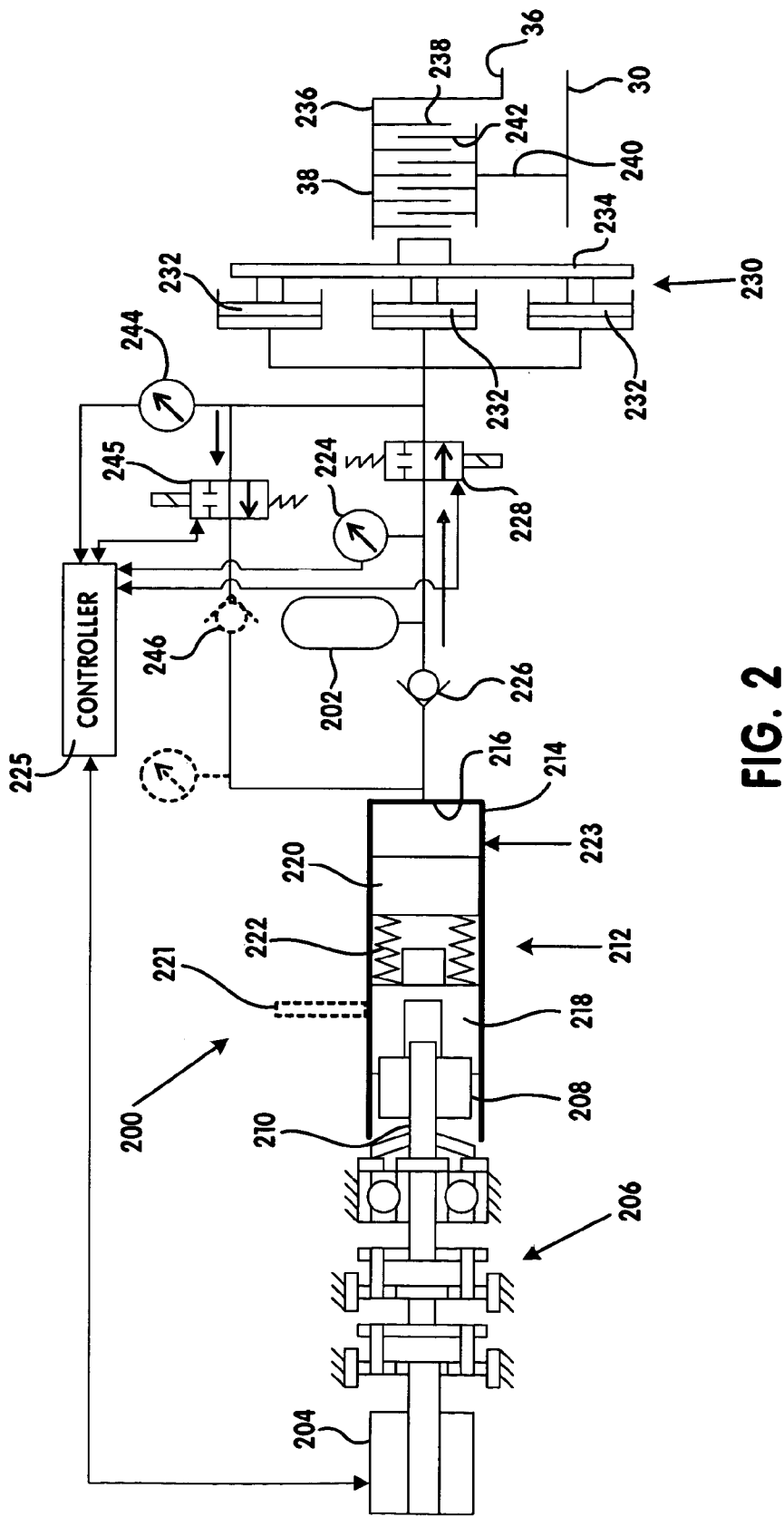
FIG. 2 is a schematic representation of a first embodiment clutch actuation system.

The first exemplary embodiment clutch control system 200 is depicted in FIG. 2. Clutch control system 200 includes an accumulator 202 as an energy storage device. Accumulator 202 may be of the gas or spring type. Clutch control system 200 also includes an electric motor 204, a gear reduction unit 206, a nut 208, and a lead screw 210 coupled to a hydraulic actuator 212. Electric motor 204 is drivingly coupled to gear reduction unit 206. The output from gear reduction unit 206 is engaged with lead screw 210. Operation of motor 204 causes lead screw 210 to rotate. Lead screw 210 is threadingly coupled to nut 208 such that rotation of lead screw 210 causes nut 208 to axially translate.

Hydraulic actuator 212 includes a housing 214 defining a cavity 216, a backing piston 218 and a master piston 220 slidably positioned within cavity 216 of housing 214. An optional vent 221 extends from housing 214 to interconnect cavity 216 with a reservoir (not shown) containing additional fluid. Backing piston 218 is fixed to nut 208. A spring 222 interconnects backing piston 218 and master piston 220. Spring 222 may be compressed to allow master piston 220 to translate toward backing piston 218. During spring compression, housing 214, master piston 220 and spring 222 function as a second or low pressure accumulator 223. Spring compression is limited by direct contact between master piston 220 and backing piston 218. Once the pistons engage one another, a relatively high pressure may be generated and provided to accumulator 202.

Clutch control system 200 also includes a first pressure sensor 224 in communication with accumulator 202. First pressure sensor 224 is operable to provide a signal indicative of the fluid pressure within accumulator 202 to a controller 225. It should be appreciated that controller 225 may be a stand alone unit or may be incorporated as part of controller 42. A non-returning check valve 226 is plumbed between cavity 216 and accumulator 202 to allow pressurized fluid to enter the accumulator but restrict flow from the accumulator toward the pressurized fluid source. A first control valve 228 is operable to selectively supply pressurized fluid within accumulator 202 to a clutch actuator assembly 230. Depending on system requirements, first control valve 228 may be a variable force solenoid, a pulse width modulation control valve, a proportional flow control valve or a proportional pressure control valve. Clutch actuator assembly 230 includes a plurality of slave pistons 232 substantially circumferentially spaced apart from one another and in communication with an apply plate 234. Apply plate 234 is axially moveable and operable to transmit a clutch engagement force to transfer clutch 38.

Transfer clutch 38 is a multi-plate clutch assembly that is arranged to transfer torque between first output shaft 30 and second output shaft 36. Transfer clutch 38 includes a cylindrical drum 236 shown to be operably fixed for rotation with second output shaft 36 and having a plurality of first or outer clutch plates 238 mounted (i.e., splined) for rotation with drum 236. A clutch hub 240 of transfer clutch 38 is fixed for rotation with first output shaft 30. A second set of clutch plates 242, referred to as inner clutch plates, are mounted (i.e., splined) for rotation with clutch hub 240. Torque is transferred between first output shaft 30 and second output shaft 36 by frictionally engaging first clutch plates 238 with second clutch plates 242 with a compression force supplied by apply plate 234.

Slave pistons 232 are slidably engageable with apply plate 234 and transmit a force proportional to the pressure acting on each of slave pistons 232. A second pressure sensor 244 is plumbed in communication with slave pistons 232. Second pressure sensor 244 is operable to output a signal indicative of the fluid pressure acting on slave pistons 232. The signal is provided to controller 225 and used as a feedback signal to control the torque generated by transfer clutch 38. A second control valve 245 is operable to selectively supply pressurized fluid acting on slave pistons 232 to second accumulator 223. As mentioned earlier, second or low pressure accumulator 223 is defined by housing 214, master piston 220 and spring 222. Second accumulator 223 contains fluid at a substantially lower pressure than accumulator 202. Pressure acting on slave pistons 232 may be selectively released to second accumulator 223 by actuating second control valve 245.

An optional second non-returning check valve 246 acts as a pressure relief valve to allow fluid previously acting on slave pistons 232 to return to cavity 216. One skilled in the art will appreciate that clutch control system 200 is a closed hydraulic system. Accordingly, fluid need not be continually supplied to clutch control system 200 once the system has been initially filled with hydraulic fluid. An account for fluid leakage may be made as will be described.

In operation, clutch control system 200 operates to charge accumulator 202 with fluid at a relatively high pressure by operating motor 204 to translate nut 208 and backing piston 218 in an advancing direction. Spring 222 and master piston 220 will also translate the same amount until pressure within cavity 216 builds to a magnitude large enough to overcome the force generated by spring 222. Pressurized fluid passes through non-returning check valve 226 and enters accumulator 202. During the accumulator charging cycle, first control valve 228 is closed. If clutch control system 200 is not equipped with a second non-returning check valve, second control valve 245 is also maintained in the closed position to charge accumulator 202. As the pressure within accumulator 202 increases, master piston 220 engages backing piston 218 and a relatively large pressure may be supplied to accumulator 202 via motor 204 and gear reduction unit 206. It should be appreciated that motor 204, gear reduction unit 206, lead screw 210 and housing 214 are designed to produce a maximum desired pressure while requiring only 5 amps or less of current from the vehicle power source.

Once the desired pressure is stored in accumulator 202 as indicated by pressure sensor 224, motor 204 reverses for a limited duration to allow backing piston 218 to be spaced apart from master piston 220 as depicted in FIG. 2. At this time, clutch control system 200 awaits a torque demand signal. Upon receipt of a signal for torque from controller 225, first control valve 228 is opened to supply pressurized fluid to slave pistons 232. The signal output from second pressure sensor 244 indicates the pressure acting upon slave pistons 232 and may be correlated to torque generated by transfer clutch 38. If a reduction in output torque from transfer clutch 38 is desired, one of two processes may accomplish this task. One method includes allowing second control valve to shift to its normally open position thereby releasing pressurized fluid into cavity 216. Master piston 220 compresses spring 222 acting as a low pressure accumulator and reduces the pressure acting upon slave pistons 232. Alternatively, motor 204 may be rotated to cause backing piston 218, spring 222 and master piston 220 to move in a retracting direction after second control valve 245 is opened. This allows more fluid to enter cavity 216 and further reduce the pressure acting on slave pistons 232.

In an alternate form, clutch control system 200 may be equipped with an alternate second control valve (not shown) that operates as a normally closed valve as opposed to the normally open configuration shown in FIG. 2. If second control valve 245 is a normally closed valve, leakage of fluid past first control valve 228 may cause transfer clutch 38 to be in an applied condition during vehicle inoperative times. Some Original Equipment Manufacturers may not wish this condition and specify the normally open second control valve. Furthermore, any number of the valves presently depicted may be plumbed as normally or normally closed valves to meet vehicle manufacturer requirements.

Figure 3:
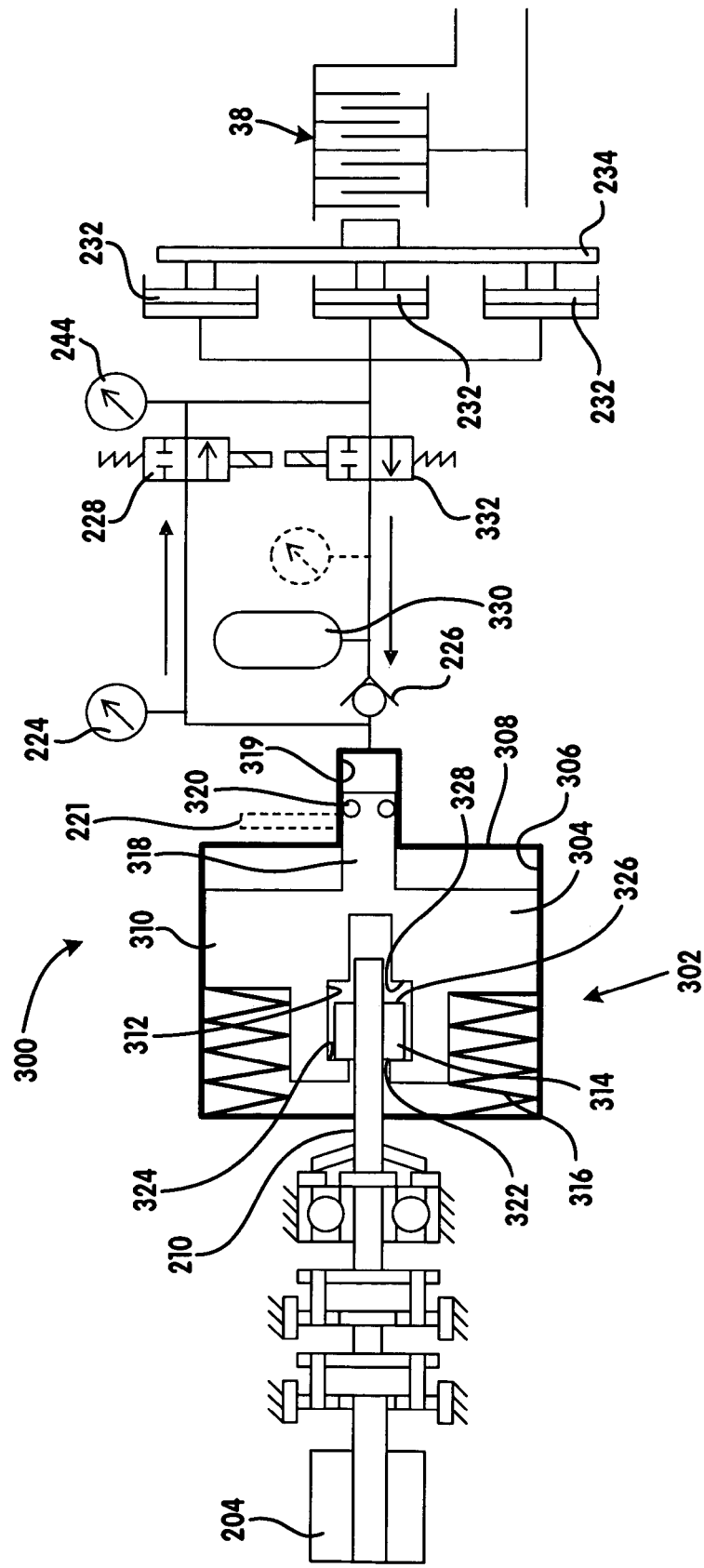
FIG. 3 is a schematic representation of an alternate embodiment clutch actuation system.

FIG. 3 depicts an alternate embodiment clutch control system 300. Clutch control system 300 is a closed system similar to -the clutch control system previously discussed. Like elements will retain the reference numerals previously introduced. Clutch control system 300 includes an actuator 302 that functions as a high pressure accumulator and master piston combination. Actuator 302 includes a power piston 304 slidably positioned within a cavity 306 of a housing 308. Power piston 304 includes a body portion 310 having a pocket 312. Pocket 312 receives a nut 314 coupled to lead screw 210. A relatively large spring 316 is positioned between housing 308 and body portion 310 of power piston 304. Clutch control system 300 is operable to convert electrical energy into mechanical potential energy by compressing spring 316. Power piston 304 also includes a stem portion 318 operably acting on hydraulic fluid contained within a hydraulic cavity 319 of housing 308. A seal 320 sealingly engages stem 318 and cavity 319 to maintain a closed hydraulic system.

Motor 204 rotates to axially displace nut 314 and engage an edge 322 of nut 314 with a wall 324 of pocket 312. Nut 314 is sized to less than completely fill pocket 312 as indicated by a second edge 326 of nut 314 being spaced apart from a wall 328 of pocket 312. Motor 204 is rotated to cause body portion 310 of power piston 304 to move in a retracting direction and compress spring 316. Once a predetermined compression has occurred, motor 204 stops. During the retraction movement of power piston 304, hydraulic fluid is supplied from a low pressure accumulator 330 to hydraulic cavity 319 in which stem portion 318 is slidably positioned. At this point in time, the position of power piston 304 is restrained by spring 316 and the fluid trapped between first non-returning check valve 226 and first control valve 228.

To ready actuator 302 for operation, motor 204 is operated to axially translate nut 314 within pocket 312 until second edge 326 contacts wall 328. During a torque request, first control valve 228 is opened. Spring 316 forces fluid through first control valve 228 into contact with slave pistons 232. Slave pistons 232 act on apply plate 234 to cause transfer clutch 38 to transmit torque. To reduce the magnitude of torque generated by transfer clutch 38, a second control valve 332 is operable to release highly pressurized fluid acting on slave pistons 232 to enter low pressure accumulator 330. If further reduction in the output torque is required, motor 204 is actuated to engage edge 322 of nut 314 with wall 324 of power piston 304 and retract stem portion 318 to allow additional hydraulic fluid to enter hydraulic cavity 319.

Clutch control system 300 is further operable to limit the amount of energy released from storage during periods of time when the vehicle is not being operated. Just prior to vehicle shutdown, actuator 302 will typically be in a condition of readiness for actuation. Such a condition exists when spring 316 has been compressed and second edge 326 of nut 314 is engaged with wall 328 of pocket 312. During vehicle storage, pressurized fluid may travel past first control valve 228 even though it is in the closed position. The amount of fluid will be limited by the allowable travel of power piston 304. Power piston 304 may only travel until wall 324 engages edge 322 of nut 314. At this time, load from spring 316 will be reacted by nut 314 and lead screw 210. As mentioned earlier, the interconnection between nut 314 and lead screw 210 is not an overrunning engagement. Accordingly, force supplied by power piston 304 to nut 314 will not cause nut 314 to be axially displaced. Because spring 316 will no longer be applying force to power piston 304, leakage through first control valve 228 will stop.

Figure 4:
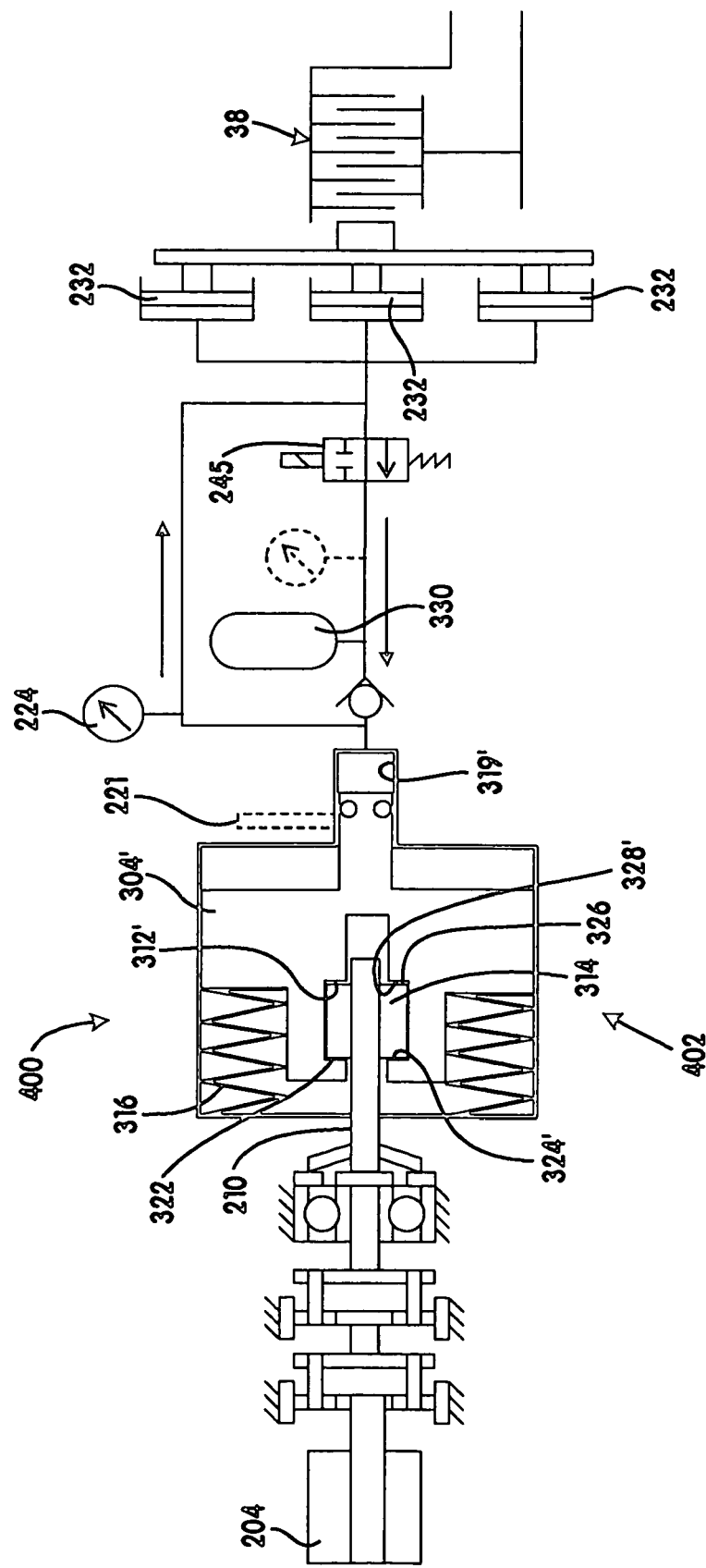
FIG. 4 is a schematic representation of an alternate embodiment clutch actuation system.

FIG. 4 depicts an alternate embodiment clutch control system 400 operable for selectively supplying an actuation force to transfer clutch 38. Clutch control system 400 is substantially similar to clutch control system 300 previously described. For clarity, like elements will retain their previously introduced reference numerals. Elements that have been modified will be identified with a prime designation.

Clutch control system 400 includes an actuator 402 operable for supplying pressurized fluid to slave pistons 232. Actuator 402 is nearly identical to actuator 302 except a pocket 312' is sized to closely surround nut 314 such that edge 322 is adjacent a wall 324' at the same time second edge 326 is nearly adjacent a wall 328' of power piston 304'. A small axial clearance may exist between nut 314 and power piston 304'. Alternatively, belleville washers (not shown) may be positioned on either side of the nut within pocket 312'. By way of further comparison to clutch control system 300, clutch control system 400 does not include first control valve 228 and second pressure sensor 244. Cavity 319' is in direct communication with slave pistons 232. First pressure sensor 224 is operable to indicate the pressure acting on slave pistons 232.

To charge actuator 402, motor 204 is operated to cause lead screw 210 to rotate. Rotation of lead screw 210 axially translates nut 314. Motor 204 is energized until spring 316 is sufficiently compressed. As described in relation to clutch control system 300, during a retracting movement of power piston 304', hydraulic fluid is supplied from low pressure accumulator 330 to hydraulic cavity 319'.

To provide pressurized fluid to slave pistons 232, electric motor 204 is actuated to move nut 314 from left to right as reviewed in FIG. 4. As nut 314 is moved, force from spring 316 is transferred to the fluid contained within cavity 319'. Second control valve 245 is maintained in an energized state during transfer clutch actuation.

To reduce the torque generated by transfer clutch 38, second control valve 245 is allowed to shift to the open position to allow pressurized fluid to enter low pressure accumulator 330. If further clutch reduction is required, motor 204 is actuated to retract power piston 304'.

Figure 5:
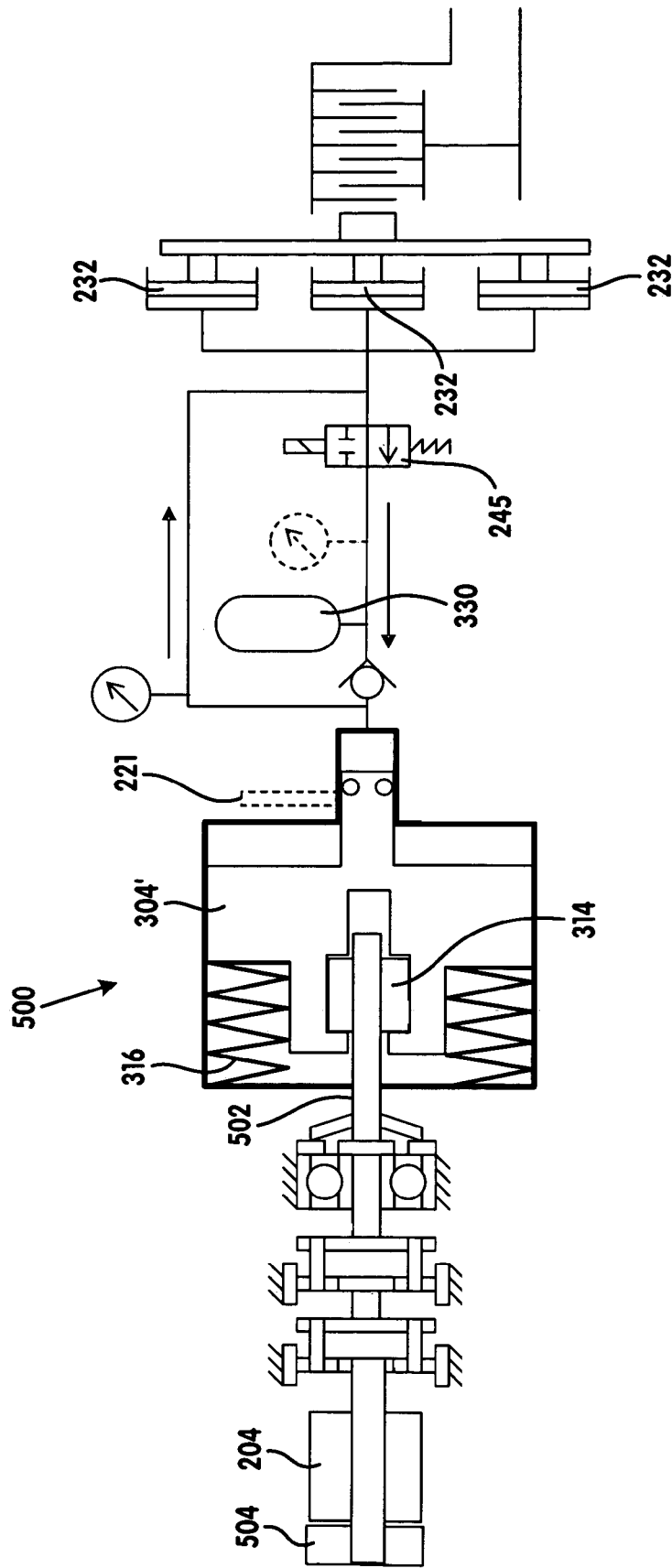
FIG. 5 is a schematic representation of an alternate embodiment clutch actuation system.

FIG. 5 depicts another alternate embodiment clutch control system identified by reference numeral 500. Clutch control system 500 is substantially similar to clutch control system 400 with the exception that lead screw 210 is replaced by a ball screw 502. A brake 504 is coupled to motor 204 to selectively resist rotation of the ball screw. When brake 504 is not actuated, the force generated by spring 316 is sufficient to cause nut 314 to overrun on the ball screw and move power piston 304' in an advancing direction. When the brake is actuated, ball screw 502 is restricted from rotation and nut 314 maintains its axial position. As such, the amount of fluid allowed to leak out from the power piston cavity during periods of non-use is limited.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an electric motor drivingly coupled to a hydraulic actuator, said hydraulic actuator including a first piston biasedly engaged by a spring, said first piston being slidably positioned within a housing and operable to supply pressurized fluid to a second piston, said spring being sized to store a predetermined quantity of energy such that supply of said pressurized fluid to said second piston provides said clutch engagement force.

2. The power transmission of claim 1 wherein said spring interconnects said first piston and a third piston, said third piston being axially drivable by said motor.

3. The power transmission of claim 2 wherein said hydraulic clutch actuation system includes an accumulator selectively chargeable by said hydraulic actuator and in selective communication with said second piston.

4. The power transmission of claim 3 wherein said pressurized fluid acting on said second piston is selectively released to act on said first piston, compress said spring and reduce said clutch engagement force.

5. The power transmission of claim 1 wherein said hydraulic clutch actuator system includes a first valve for selectively fluidly coupling said accumulator to said second piston.

6. The power transmission of claim 5 wherein said hydraulic clutch actuation system includes an exhaust valve for selectively coupling a pressure chamber containing said second piston and said first piston, said exhaust valve being operable to release pressure in said pressure chamber, thereby reducing said clutch engaging force on said friction assembly.

7. The power transmission of claim 6 further including a controller and a pressure sensor operable to provide said controller a signal indicative of a fluid pressure within said pressure chamber.

8. The power transmission of claim 7 wherein said controller is operable to actuate said first valve and said exhaust valve to maintain a desired pressure within said pressure chamber.

9. The power transmission of claim 8 wherein said controller is operable to control the operation of said electric motor to maintain said pressure within said accumulator within a desired range.

10. The power transmission of claim 2 further including a rotatable screw drivingly coupled to said electric motor, said third piston being coupled to said screw and operable to translate in response to rotation of said screw.

11. The power transmission device of claim 1 wherein said motor is operable to compress said spring and store energy, said hydraulic clutch actuation system being operable to selectively apply said stored energy of said spring to said first piston thereby providing pressurized fluid to said second piston to apply said clutch engagement force.

12. The power transmission device of claim 11 wherein said first piston includes a pocket in receipt of a nut threadingly engaged with a lead screw, said lead screw being drivable by said motor, said nut being axially drivable by rotation of said lead screw.

13. The power transmission of claim 12 wherein a clearance exists between said nut and said first piston to allow said spring to transfer load through said first piston to pressurize said fluid.

14. The power transmission device of claim 1 wherein said hydraulic actuation system is a closed hydraulic system including a supply line and a return line in communication with said hydraulic actuator.

15. A power transmission device comprising:
a rotary input member adapted to receive drive torque from a source of torque;
a rotary output member adapted to provide drive torque to an output device;
a torque transfer mechanism operable for transferring drive torgue from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an electric motor drivingly coupled to a hydraulic actuator, said hydraulic actuator including a first piston biasedly engaged by a spring, said first piston being slidably positioned within a housing and operable to supply pressurized fluid to a second piston, wherein supply of said pressurized fluid to said second piston provides said clutch engagement force; and
an exhaust valve operable to selectively release pressurized fluid from a pressure chamber containing said second piston.

16. The power transmission device of claim 15 wherein said exhaust valve selectively supplies an accumulator with pressurized fluid from said pressure chamber.

17. The power transmission device of claim 16 further including a controller and a pressure sensor operable to provide said controller a signal indicative of a fluid pressure within said pressure chamber.

18. The power transmission device of claim 17 wherein said controller is operable to actuate said hydraulic actuator and said exhaust valve to maintain a desired pressure within said pressure chamber.

19. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including a first piston biasedly engaged by a spring and an electric actuator operable to selectively compress and release said spring, said first piston being slidably positioned within a housing and operable to directly supply pressurized fluid to a second piston when said spring is released, wherein supply of said pressurized fluid to said second piston provides said clutch engagement force.

20. The power transmission device of claim 19 wherein said electric actuator includes an electric motor drivingly coupled to a rotary to linear movement conversion mechanism.

21. The power transmission device of claim 20 wherein said rotary to linear movement conversion mechanism includes a rotatable screw threadingly engaged with an axially translatable nut.

22. The power transmission device of claim 21 wherein said nut is positioned within a pocket formed within said first piston.

23. The power transmission device of claim 22 wherein said hydraulic clutch actuation system includes a housing slidably supporting said first piston and also containing said spring, wherein said first piston includes a reduced diameter portion in communication with said pressurized fluid and an enlarged diameter portion acted on by said spring.

24. The power transmission device of claim 23 wherein said fluid is stored within an accumulator plumbed in a line interconnecting said first and second pistons.

25. The power transmission device of claim 19 wherein said hydraulic clutch actuation system includes a first valve for selectively fluidly coupling said second piston to an accumulator to reduce said clutch engagement force.

26. The power transmission device of claim 25 further including a controller operable to control said first valve and said electric motor to maintain a desired pressure within said accumulator.

27. The power transmission device of claim 19 wherein said hydraulic clutch actuation system includes a controller and a pressure sensor operable to provide said controller a signal indicative of a fluid pressure acting on said second piston.

28. The power transmission device of claim 27 wherein said controller is operable to actuate a valve to maintain a desired pressure acting on said second piston.

29. A power transmission device comprising:
a friction clutch assembly; and
a clutch actuation system operable to apply a clutch engagement force to said friction clutch assembly, said clutch actuation system including an electrically powered actuator coupled to a first piston to cause bi-directional translation of said first piston, a spring compressible upon movement of said first piston in one of the translational directions and a hydraulic circuit having fluid in communication with said first piston and a second piston providing said clutch engagement force, wherein said actuator compresses said spring to store energy for subsequent release during actuation of said friction clutch assembly, said clutch actuation system being operable to release said stored energy at a rate substantially greater than an average power draw incurred while compressing said spring.

30. The power transmission device of claim 29 wherein said hydraulic circuit includes a controller for controlling said actuator and a valve, said valve selectively releasing pressurized fluid from action on said second piston.

* * * * *